US011196799B2

(12) United States Patent
Vajravel et al.

(10) Patent No.: US 11,196,799 B2
(45) Date of Patent: Dec. 7, 2021

(54) REDIRECTION OF USB DEVICES FROM HARDWARE ISOLATED VIRTUAL DESKTOP INFRASTRUCTURE CLIENTS

(71) Applicant: Dell Products L.P., Round Rock, TX (US)

(72) Inventors: Gokul Thiruchengode Vajravel, Bangalore (IN); Jyothi Bandakka, Bengaluru (IN); Ramanujam Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/780,137

(22) Filed: Feb. 3, 2020

(65) Prior Publication Data
US 2021/0243245 A1 Aug. 5, 2021

(51) Int. Cl.
*H04L 29/08* (2006.01)
*H04L 29/06* (2006.01)
*G06F 9/455* (2018.01)
*G06F 9/451* (2018.01)

(52) U.S. Cl.
CPC .............. *H04L 67/08* (2013.01); *G06F 9/452* (2018.02); *G06F 9/45533* (2013.01); *H04L 67/14* (2013.01); *H04L 67/42* (2013.01)

(58) Field of Classification Search
CPC ......... H04L 67/08; H04L 67/14; H04L 67/42; H04L 67/148; H04L 67/2814; G06F 9/452; G06F 9/45533
See application file for complete search history.

(56) References Cited

U.S. PATENT DOCUMENTS

| | | | | |
|---|---|---|---|---|
| 8,554,957 B1* | 10/2013 | Wieland | ............... | G06F 13/102 710/8 |
| 9,036,509 B1* | 5/2015 | Addepalli | ......... | H04W 28/0215 370/259 |
| 10,742,649 B1* | 8/2020 | Hook, Jr. | ............ | H04L 63/0876 |
| 2002/0120800 A1* | 8/2002 | Sugahara | ............... | G06F 13/24 710/260 |
| 2009/0094387 A1* | 4/2009 | Bunger | ................... | G06F 3/038 710/11 |
| 2009/0150550 A1* | 6/2009 | Barreto | ............ | H04L 29/08846 709/228 |
| 2012/0158822 A1* | 6/2012 | Dai | .......................... | G06F 9/54 709/203 |

(Continued)

*Primary Examiner* — Javier O Guzman
(74) *Attorney, Agent, or Firm* — Kirton McConkie; Brian Tucker

(57) ABSTRACT

USB devices can be redirected from hardware isolated VDI clients. When a VDI client is run in a hardware isolated environment, a notification service can also be run in the hardware isolated environment to enable a USB device that is not accessible within the hardware isolated environment to be redirected to a server on which the VDI client has established a remote session. In some cases, an agent can also be employed in the hardware isolated environment to temporarily redirect the USB device to the hardware isolated environment for use in establishing the remote session before the USB device is redirected to the server. Similar techniques can be employed to redirect a USB device to a hardware isolated environment so that the USB device can be accessed by an application running in the hardware isolated environment.

20 Claims, 15 Drawing Sheets

(56) References Cited

U.S. PATENT DOCUMENTS

| | | | |
|---|---|---|---|
| 2012/0226998 A1* | 9/2012 | Friedl | H04L 65/1069 |
| | | | 715/760 |
| 2015/0056978 A1* | 2/2015 | Kobayashi | H04W 4/70 |
| | | | 455/420 |
| 2016/0099948 A1* | 4/2016 | Ott | H04L 63/0281 |
| | | | 726/1 |
| 2017/0289313 A1* | 10/2017 | Vajravel | G06F 13/385 |
| 2017/0308492 A1* | 10/2017 | Vajravel | G06F 13/385 |
| 2017/0318112 A1* | 11/2017 | Johnsimon | H04L 67/2814 |
| 2017/0339234 A1* | 11/2017 | Vajravel | G06F 13/1642 |
| 2018/0034938 A1* | 2/2018 | Huang | H04L 67/148 |
| 2018/0129510 A1* | 5/2018 | Zhang | G06F 9/452 |
| 2018/0212817 A1* | 7/2018 | Vajravel | G06F 13/385 |
| 2020/0287735 A1* | 9/2020 | Liao | H04L 12/1827 |

* cited by examiner

REDIRECTION OF USB DEVICES FROM HARDWARE ISOLATED VIRTUAL DESKTOP INFRASTRUCTURE CLIENTS

CROSS-REFERENCE TO RELATED APPLICATIONS

N/A

BACKGROUND

The present invention is generally directed to techniques for redirecting USB devices in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

VDI client 255 can represent the client-side application that establishes and maintains a remote session with server 104. As examples only, VDI client 255 could represent the VMWare Horizon client, the Citrix Workspace App, the Microsoft Remote Desktop client, etc. FIG. 2 represents a VDI environment where VDI client 255 is not hardware isolated. For example, VDI client 255 may be a desktop application or a browser-based application that runs on the host operating system and will therefore have access to device 240 via the host operating system. Accordingly, when VDI client 255 establishes a remote session, it can directly employ information about the remote session to cause device 240 to be redirected to server 104 for access within the remote session.

To enhance security, applications may be run in a hardware isolated environment. For example, Microsoft's Edge browser runs in a Hyper-V container which is a virtual machine that runs its own guest operating system on which the Edge browser runs. In non-Windows environments, other hypervisors are commonly used to isolate the browser or other applications (e.g., running the Bromium browser or another application in a uXen, XenServer, or KVM virtual machine).

In comparison to FIG. 2, if VDI client 255 were run on client 102 in a hardware isolated environment, whether as an HTML5-based application that runs in the browser or as a traditional desktop application, it would not have access to client 102's physical hardware. To the contrary, VDI client 255 would only have access to emulated hardware such as an emulated keyboard and mouse. Because of this, when VDI client 255 is run in a hardware isolated environment, current solutions do not provide a way to redirect USB devices.

BRIEF SUMMARY

The present invention extends to methods, systems, and computer program products for redirecting USB devices from hardware isolated VDI clients. When a VDI client is run in a hardware isolated environment, a notification service can also be run in the hardware isolated environment to enable a USB device that is not accessible within the hardware isolated environment to be redirected to a server on which the VDI client has established a remote session. In some cases, an agent can also be employed in the hardware isolated environment to temporarily redirect the USB device to the hardware isolated environment for use in establishing the remote session before the USB device is redirected to the server. Similar techniques can be employed to redirect a USB device to a hardware isolated environment so that the USB device can be accessed by an application running in the hardware isolated environment.

In some embodiments, the present invention is implemented as a method for enabling a USB device that is connected to a client terminal to be accessed within a remote session that a VDI client establishes on a server when the VDI client runs in a hardware isolated environment on the client terminal. A notification service that runs in the hardware isolated environment receives connection information for the remote session that the VDI client has established on the server. The notification service then sends the connection information for the remote session to a proxy that runs on the client terminal outside the hardware isolated environment. The proxy employs the connection information for the remote session to redirect the USB device to the server to thereby cause the USB device to become accessible within the remote session.

In some embodiments, the present invention is implemented as computer storage media storing computer executable instructions which when executed on a client terminal implement a method for enabling a USB device that is connected to a client terminal to be accessed within a remote session that a VDI client establishes on a server when the VDI client runs in a hardware isolated environment on the client terminal. In response to the VDI client establishing the remote session on the server, a notification service that runs in the hardware isolated environment receives connection information for the remote session. The notification service sends the connection information for the remote session to a proxy that runs on the client terminal outside the hardware isolated environment. The proxy employs the connection information for the remote session to redirect the USB device to the server to thereby cause the USB device to become accessible within the remote session.

In some embodiments, the present invention is implemented as a method for enabling a USB device that is connected to a client terminal to be accessed when an application runs in a hardware isolated environment on the client terminal. In conjunction with the hardware isolated environment being created on the client terminal, an agent is run in the hardware isolated environment. The agent sends connection information for the hardware isolated environment to a proxy that runs on the client terminal outside the hardware isolated environment. The proxy employs the connection information to redirect the USB device to the hardware isolated environment to thereby cause the USB device to become accessible to an application that runs in the hardware isolated environment.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "hardware isolated environment" should be construed as an environment within a client that isolates an application from the client's hardware. A hardware isolated environment may oftentimes be created using a hypervisor and may be in the form of a virtual machine. Common examples of hardware isolated environments include Hyper-V containers, Bromium micro virtual machines and Kernel-based Virtual Machines (KVMs), among many others.

Figure 1:
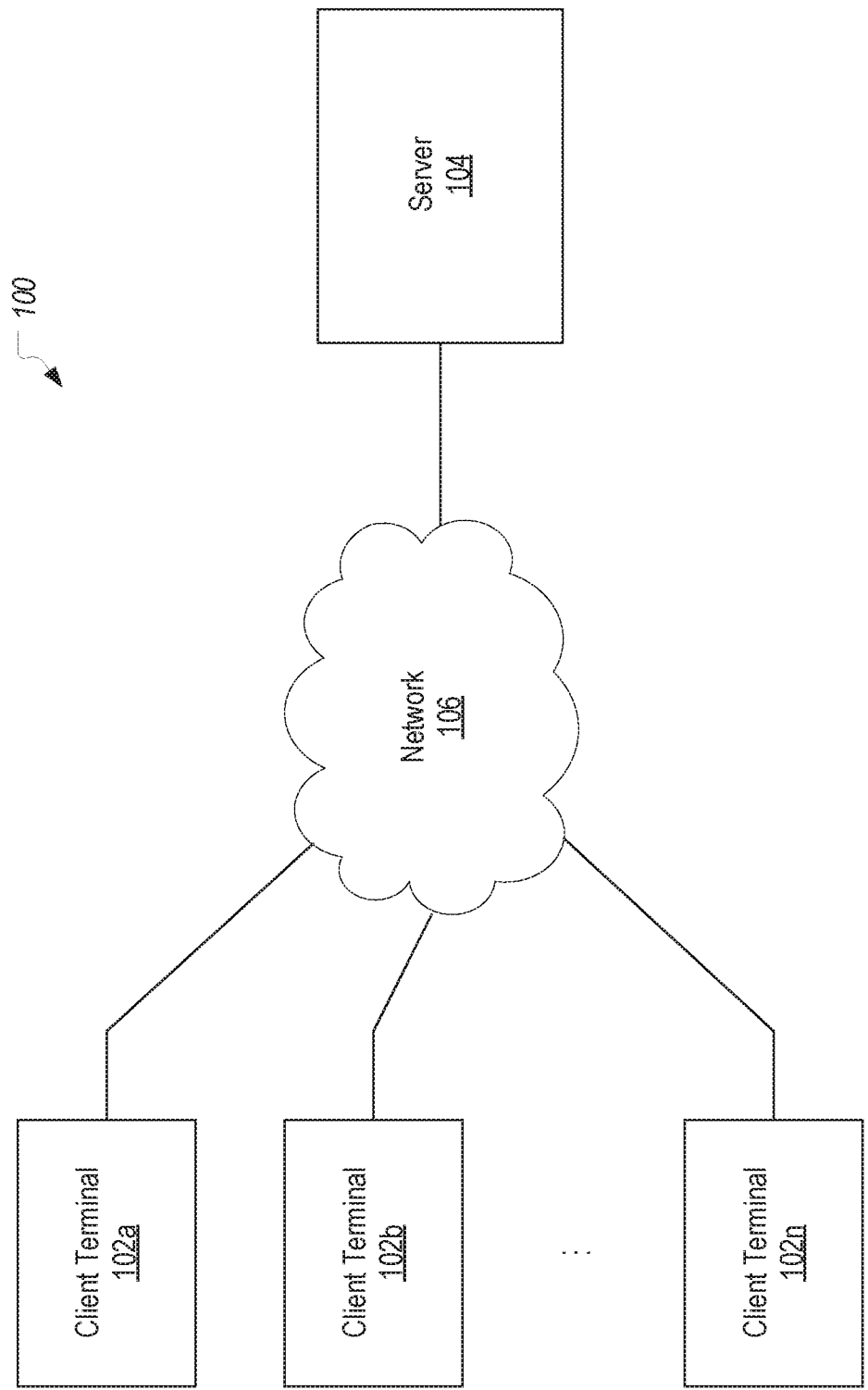
FIG. 1 illustrates an example computing environment in which the present invention can be implemented.
Figure 2:
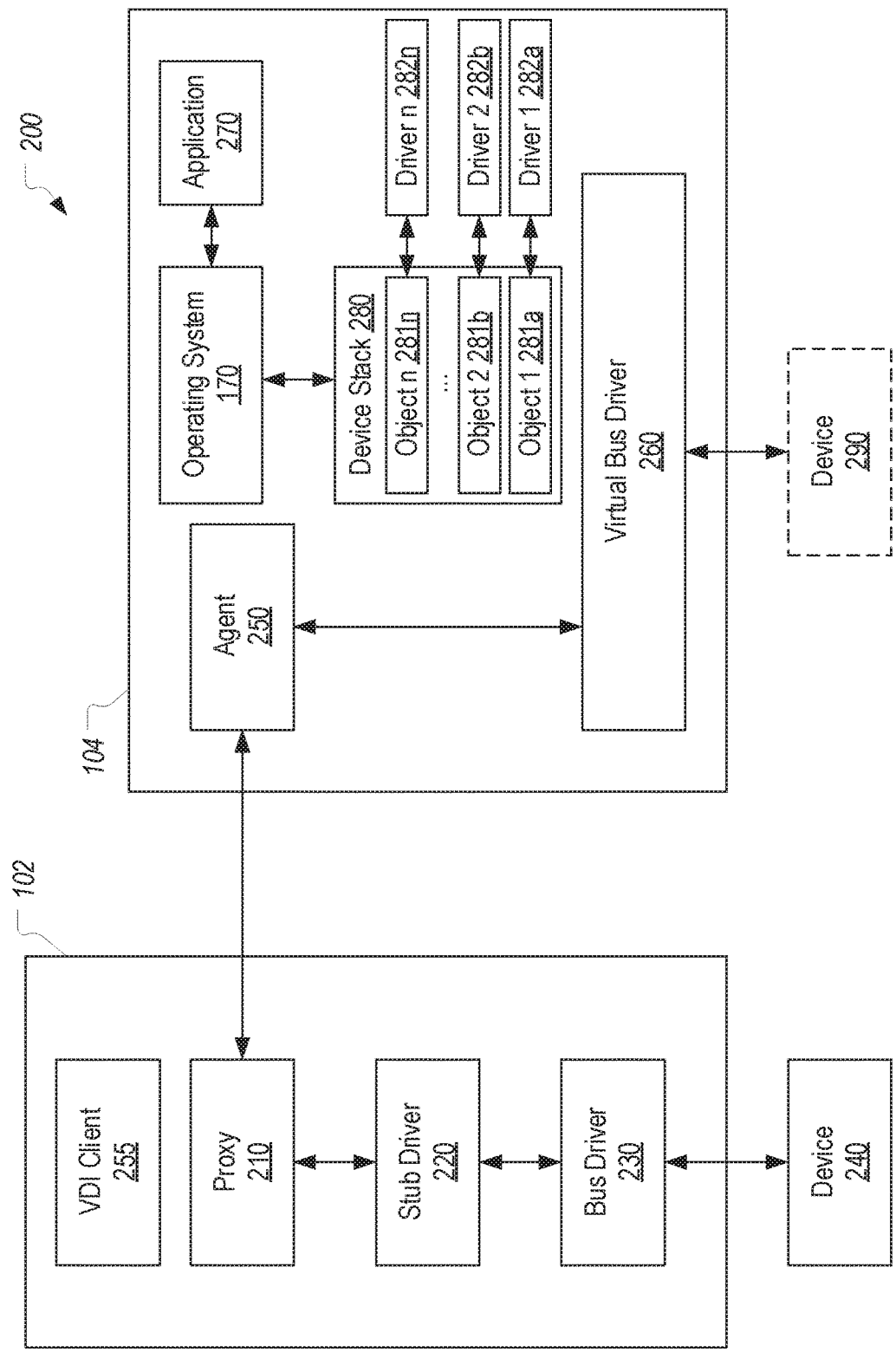
FIG. 2 illustrates a general architecture that may exist when a USB device is redirected from a client terminal to a server.
Figure 3:
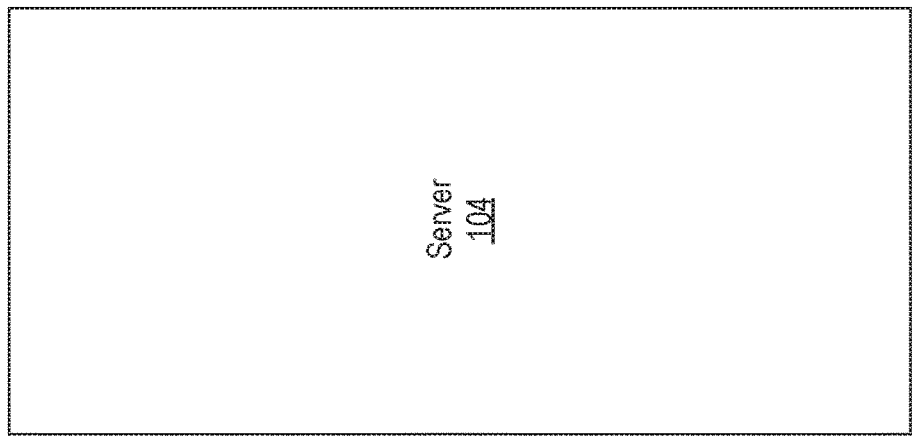
FIG. 3 illustrates an example of a hardware isolated environment in which a VDI client may be run.
Figure 3:
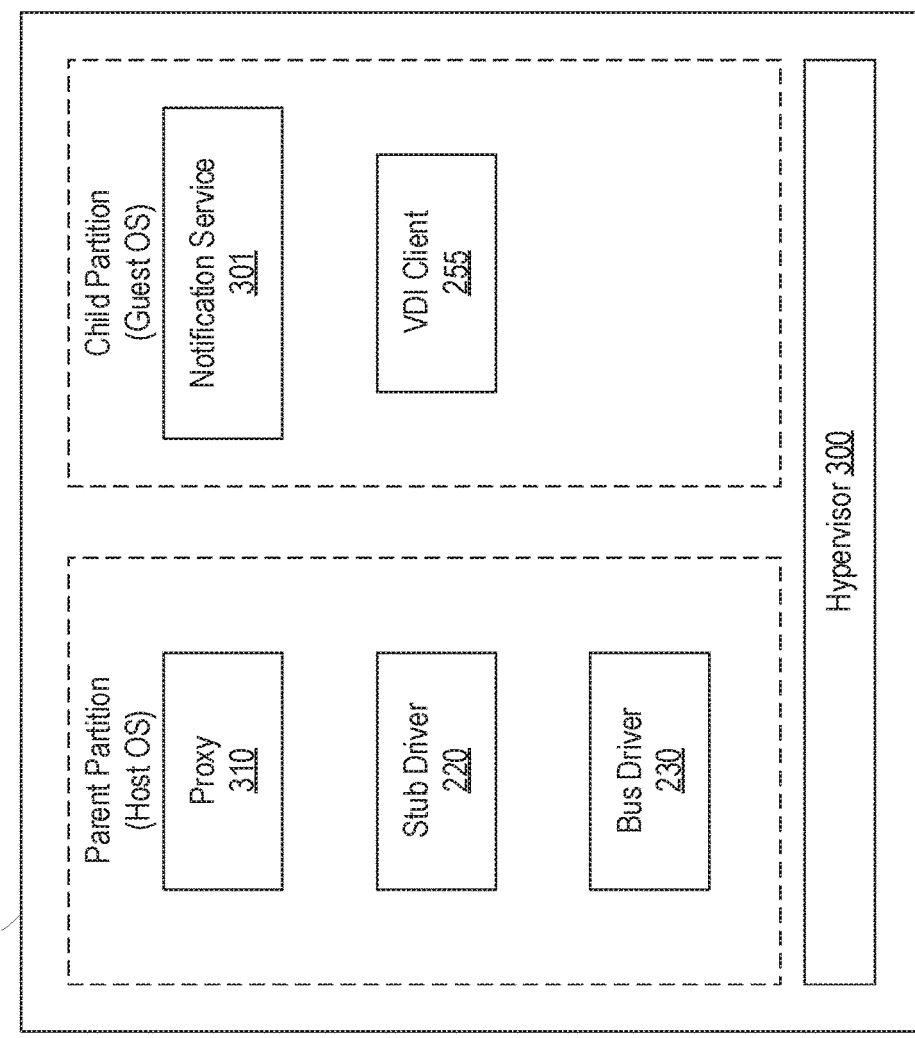

FIG. 3 illustrates an example of a Windows-based hardware isolated environment that may exist on client 102. In contrast to FIG. 2, in FIG. 3, client 102 includes a hypervisor 300 that creates and runs virtual machines on client 102. Client 102 is shown as including a parent (or root) partition in which the host operating system (OS) is run. Notably, components running in the parent partition have access to hardware resources including USB devices that may be connected to or integrated into client 102. Such components include bus driver 230, stub driver 220 and proxy 310. Proxy 310 can perform similar functionality as proxy 210 but can be configured to support the functionality described below. Proxy 310, stub driver 220 and bus driver 230 can each be configured to load when the host OS is started.

Client 102 is also shown as including a child partition which is a virtual machine in which a guest OS is run. Unlike the parent partition, the child partition does not have direct access to client 102's hardware resources. Accordingly, VDI client 255, which is run on the guest OS within the child partition, would not have access to device 240 even though it is connected to client 102. As mentioned above, VDI client 255 could be a desktop application that runs directly on the guest OS or could be a browser-based application that runs within a browser. As one particular example, if the Edge browser were employed on client 102 to run VDI client 255, the Edge browser would be launched within a child partition in the manner shown in FIG. 3 so that VDI client 255 would be run in isolation.

A notification service 301 can also be run in the child partition with VDI client 255. For example, in Windows environments, a Hyper-V container can be created with a Windows base OS image that includes VDI client 255 and notification service 301. As a result, whenever VDI client 255 is launched on client 102, notification service 301 will also be launched and run concurrently with VDI client 255 within the child partition. Similar techniques could be employed in non-Windows (or non-Hyper-V) environments to ensure that notification service 301 runs concurrently with VDI client 255 in the hardware isolated environment. For simplicity, server 104 is depicted in FIG. 3 without any of the components that are shown in FIG. 2. Yet, server 104 could have the same architecture as shown in FIG. 2 or any architecture that would support USB redirection.

Figure 4A:
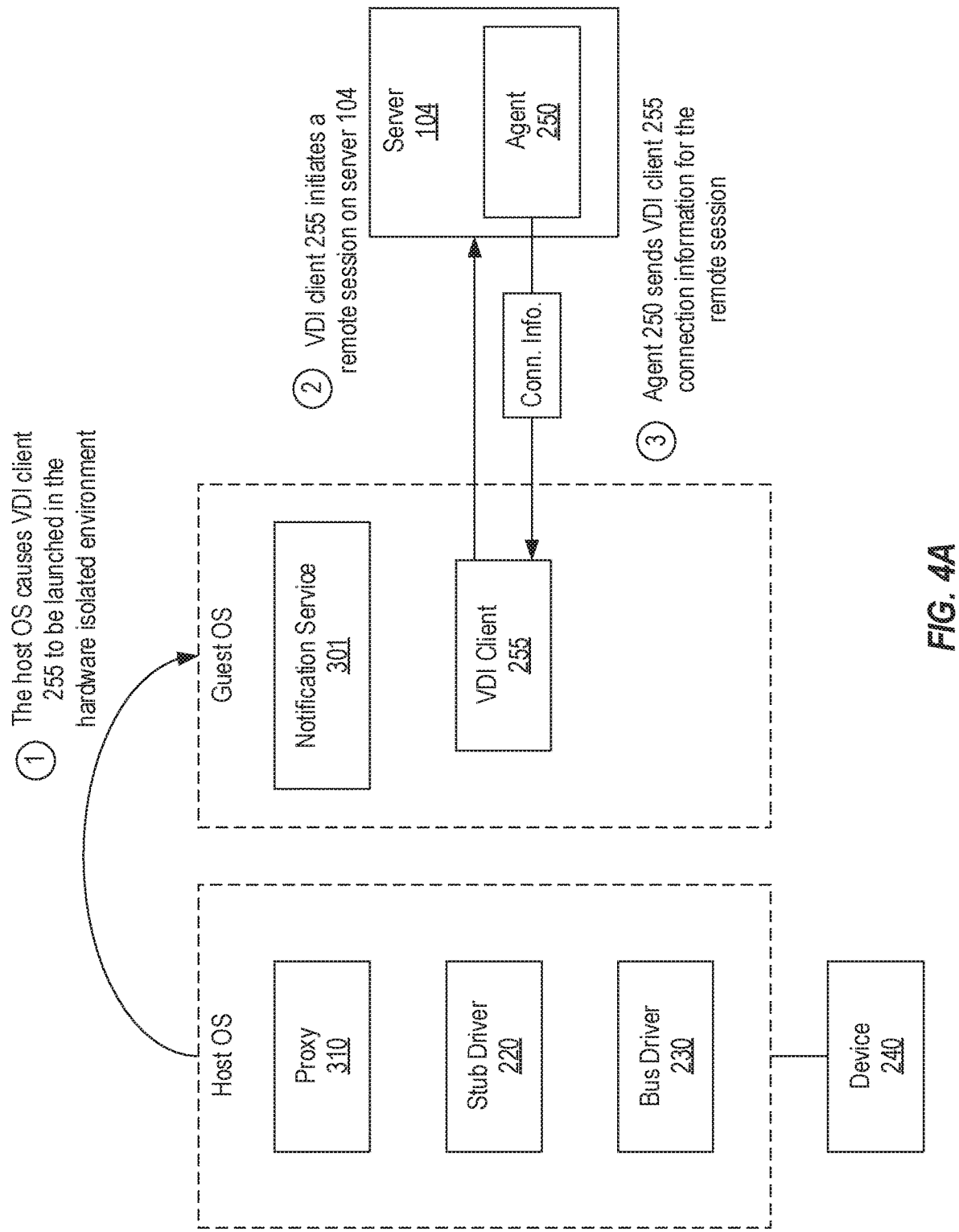
FIGS. 4A-4D illustrate an example of how a USB device that is not accessible to a VDI client running in a hardware isolated environment can be redirected to a server for access from a remote session that the hardware isolated VDI client established.

FIGS. 4A-4D provide an example of how the components depicted in FIG. 3 can interact to enable device 240 to be accessed from a remote session that VDI client 255 established on server 104. With reference to FIG. 4A, in step 1, the host OS causes VDI client 255 to be launched in a hardware isolated environment. As an example, in a Windows environment, the user could select the Edge browser which in turn would cause host OS to create a child partition (or VM) and run the Edge browser therein. The user could then employ the Edge browser to run VDI client 255 (e.g., by navigating to a particular website where an HTML5 VDI client is available). As another example, client 102 could be configured to automatically create a hardware isolated environment (e.g., a VM or similar container) at startup and launch VDI client 255 therein, whether as a desktop or web application. Regardless of how and when VDI client 255 is launched within the hardware isolated environment, it will not have access to device 240.

In accordance with embodiments of the present invention, notification service 301 can also be run within the hardware isolated environment and can be configured to interface with VDI client 255 to enable device 240 to become accessible within a remote session established by VDI client 255 even though VDI client 255 is prevented from having access to USB device 240 on client 102. For example, in step 2, it is assumed that VDI client 255 initiates a remote session on server 104. VDI client 255 can establish this remote session in any suitable manner. Once the remote session is established, agent 250 will be running on server 104 and, in step 3, can send back connection information for the remote session. This connection information may typically include an IP address of server 104 (which may typically be a VM), a port at which agent 250 is listening and a session ID of the remote session.

Figure 4B:
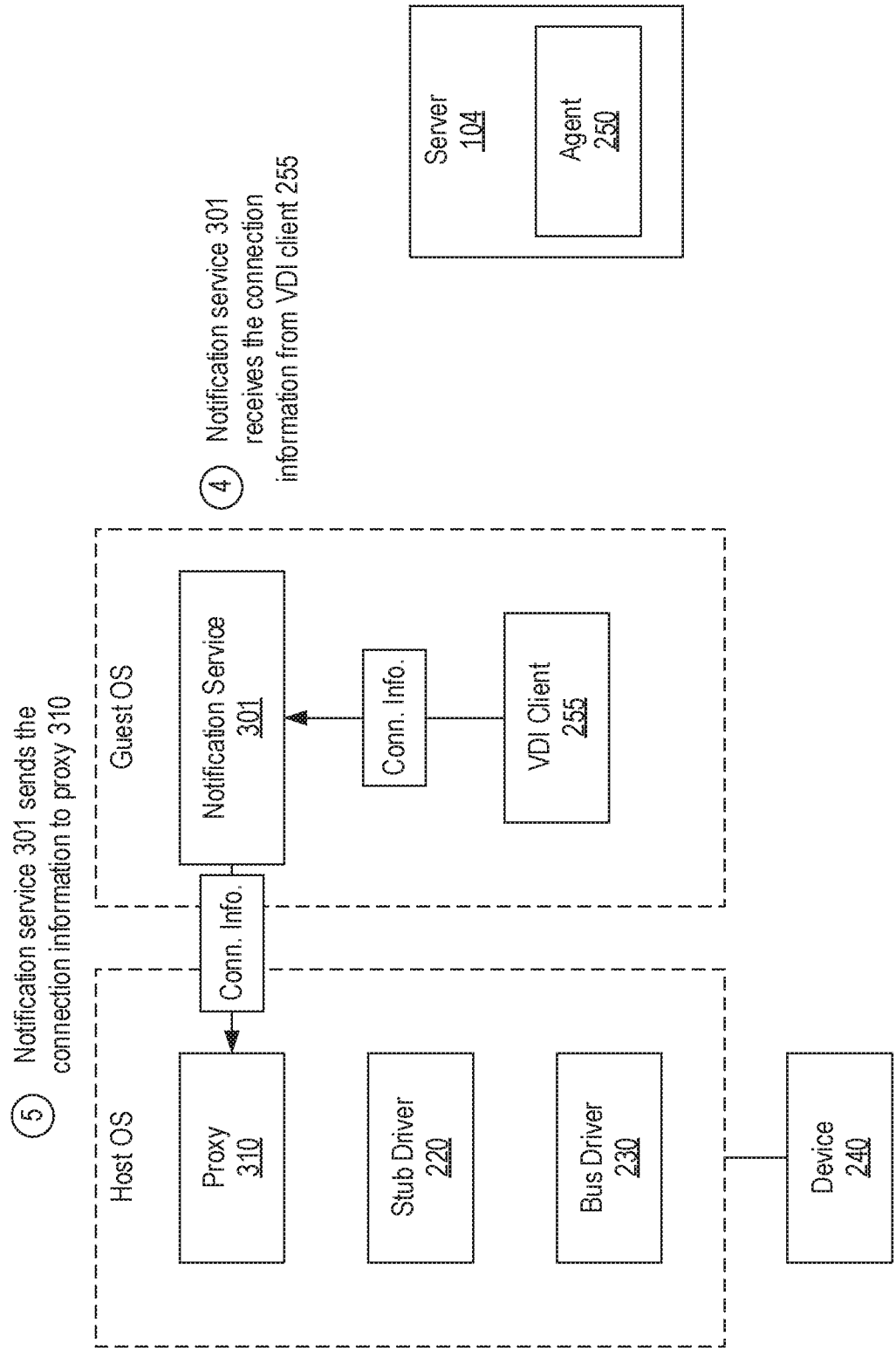

Turning to FIG. 4B, in step 4, notification service 301 receives the connection information for the remote session from VDI client 255. As an example, notification service 301 could be a .dll file, a .so file or another type of file that is registered to be loaded as a virtual channel endpoint when VDI client 255 is initialized. In such cases, as part of loading, notification service 301 can register to receive connection information that is sent to VDI client 255. In any case, once notification service 301 receives the connection information for the remote session, in step 5, it sends the connection information to proxy 310 that is not running in the hardware isolated environment. For example, notification service 301 and proxy 310 can be configured to establish a private network (e.g., a Hyper-V private network) by which notification service 301 can send the connection information for the remote session to proxy 310.

Figure 4C:
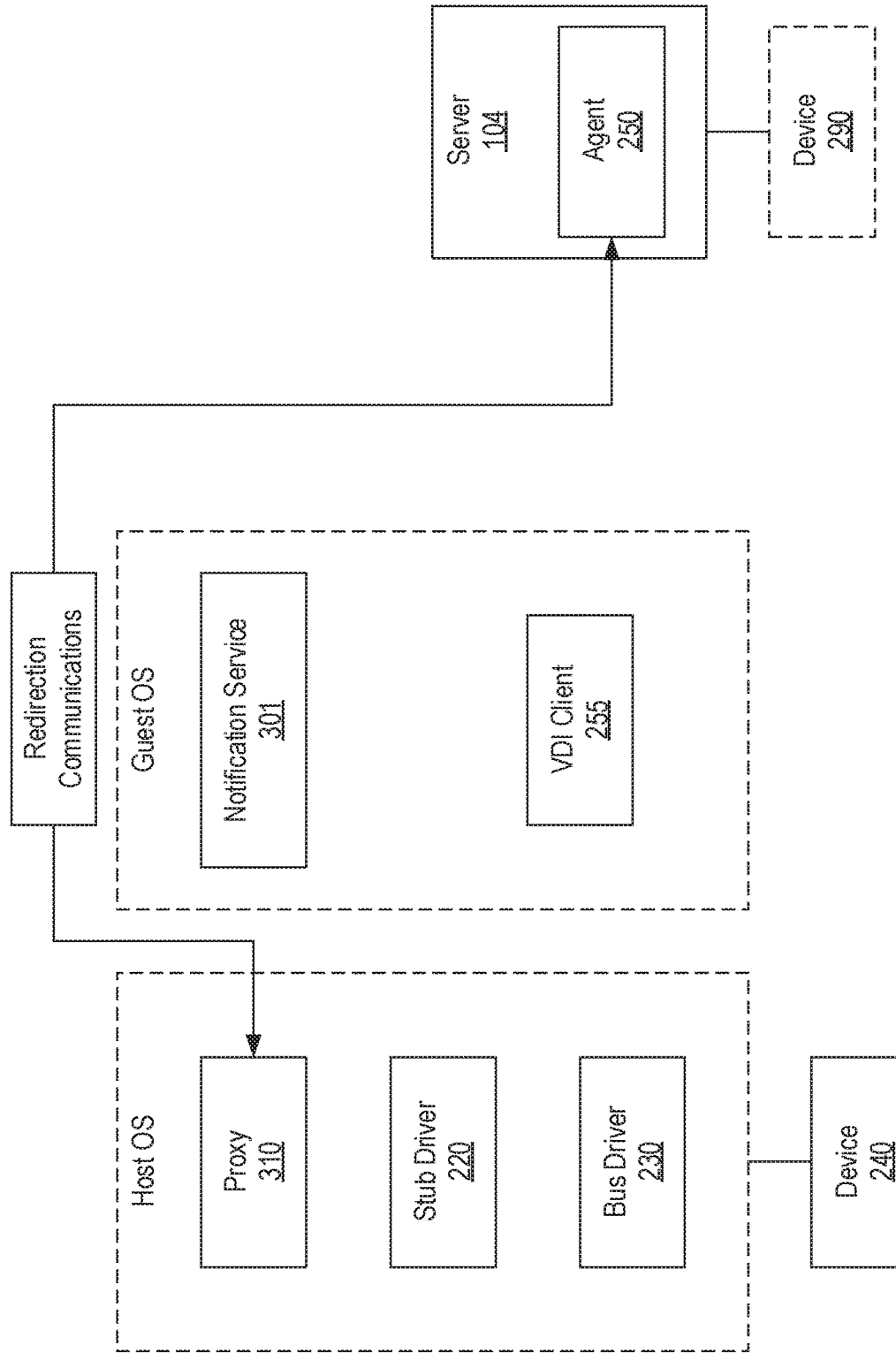

Turning to FIG. 4C, once proxy 310 has received the connection information for the remote session on server 104, in step 6, it can employ this connection information to communicate with agent 250 to redirect device 240 to server 104 (i.e., to cause virtualized device 290 to appear on server 104). Due to this redirection, device 240 will become accessible on server 104 within the remote session that VDI client 255 has established. For example, if device 240 is a printer and the user of client 102 causes Microsoft Word to be run in the remote session, the user will be able to print Word documents to the printer even though the hardware isolated environment on client 102 prevents VDI client 255 from accessing the printer.

Figure 4D:
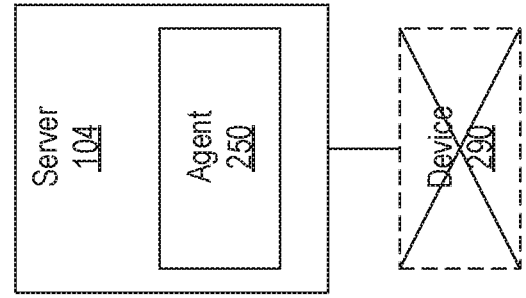
Figure 4D:
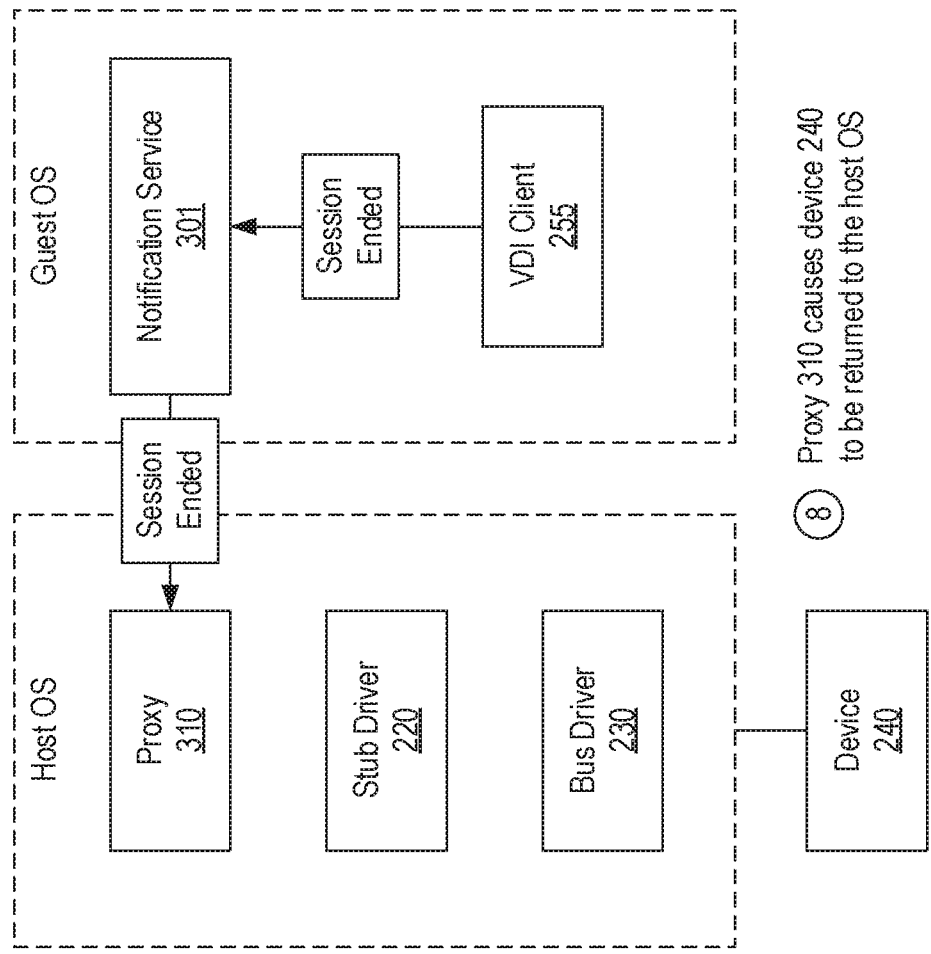

Turning to FIG. 4D, when the session is terminated, VDI client 255 can notify notification service 301. For example, as part of loading, notification service 301 can register with VDI client 255 to receive notifications when a remote session is terminated. In response to receiving notification that the remote session has terminated, in step 7, notification service 301 can send a corresponding notification to proxy 310 to inform proxy 310 that the remote session has terminated. In response, in step 8, proxy 310 can cause device 240 to be returned to client 240. For example, in a Windows implementation, proxy 310 could return device 240 to client 102 by sending an IOCTL_INTERNAL_USB_RESET_PORT I/O control request.

Figure 5:
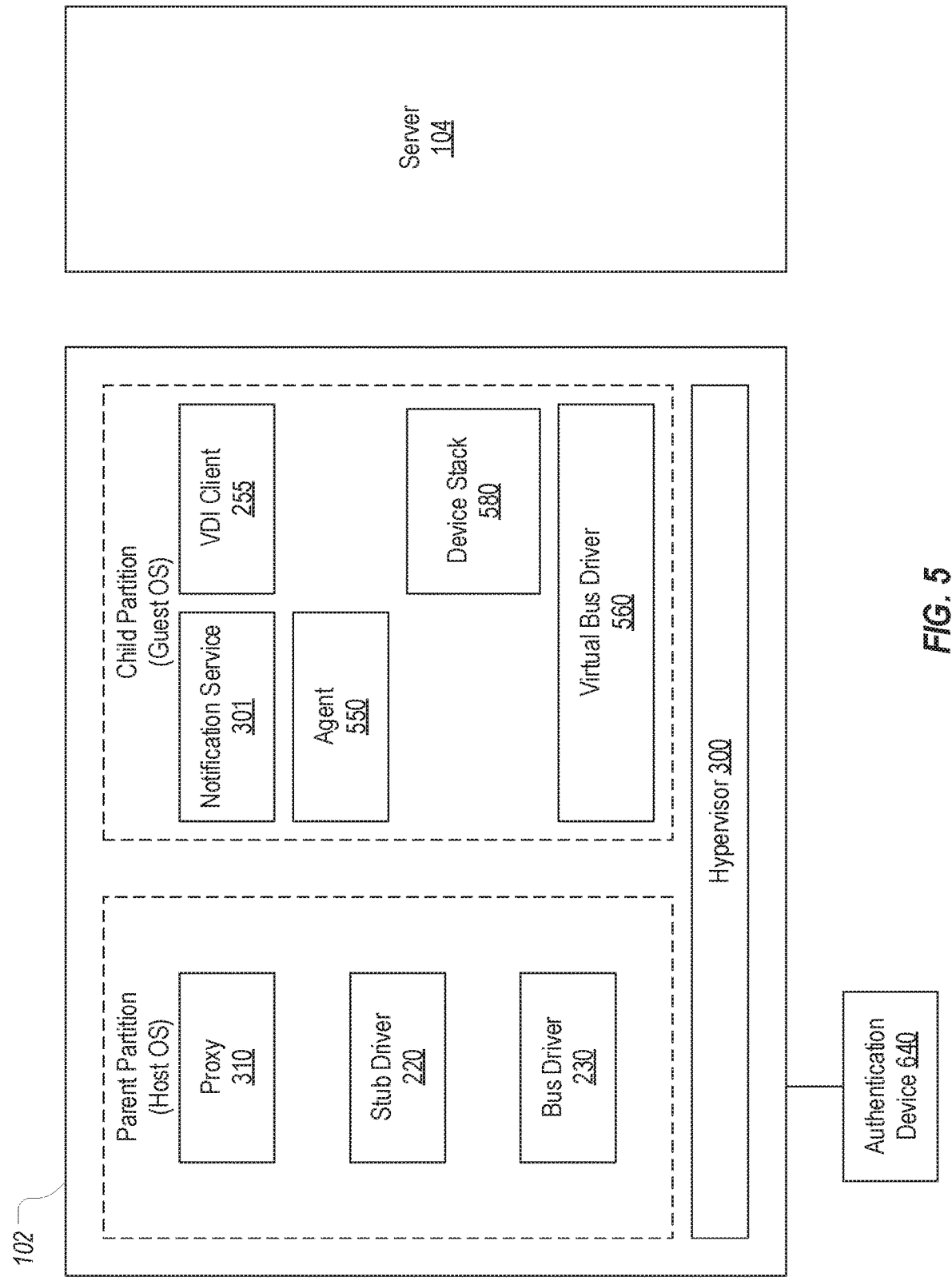
FIG. 5 illustrates another example of a hardware isolated environment in which a VDI client may be run.

In the embodiments represented in FIGS. 3-4D, device 240 does not become accessible to VDI client 255, but rather is accessible to server-side applications running within the remote session. However, in some environments, VDI client 255 may need access to device 240 in order to establish a remote session on server 104 such as when device 240 is a smart card reader or other type of authentication device. FIG. 5 illustrates how the hardware isolated environment of FIG. 3 can be modified to enable VDI client 255 to access an authentication device 640 that is physically connected to client 102 but inaccessible to components in the hardware isolated environment. In addition to including VDI client 255 and notification service 301, the hardware isolated environment in FIG. 5 also includes agent 550, virtual bus driver 560 and device stack 580. FIGS. 6A-6E provide an example of how the components depicted in FIG. 5 can interact to initially enable VDI client 255 to access and employ authentication device 640 to establish a remote session and then enable authentication device 640 to be accessed from the remote session.

Figure 6A:
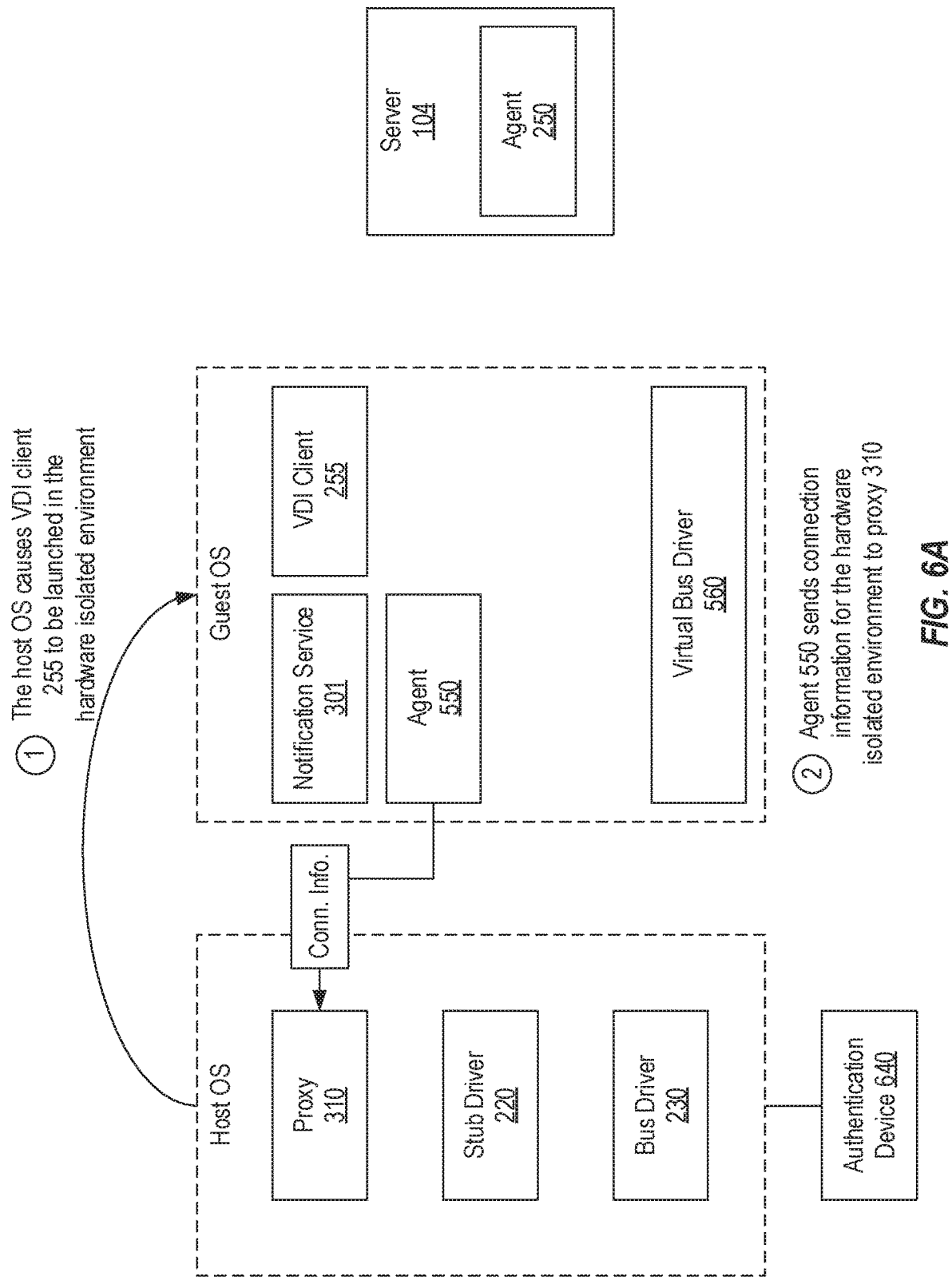
FIGS. 6A-6E illustrate an example of how a USB device that is not accessible to a VDI client running in a hardware isolated environment can be initially redirected to the hardware isolated environment for use in establishing a remote session on a server and subsequently redirected to the server for access from the remote session.

Turning to FIG. 6A, in step 1, the host OS causes VDI client 255 to be launched in the hardware isolated environment and is therefore similar to step 1 of FIG. 4A. However, in addition to launching VDI client 255 and notification service 301, agent 550 and virtual bus driver 560 can also be launched. Then, in step 2, agent 550 can send connection information for the hardware isolated environment to proxy 310. This connection information can include an IP address of the hardware isolated environment (e.g., the IP address of a VM) and a port number on which agent 550 is listening.

Figure 6B:
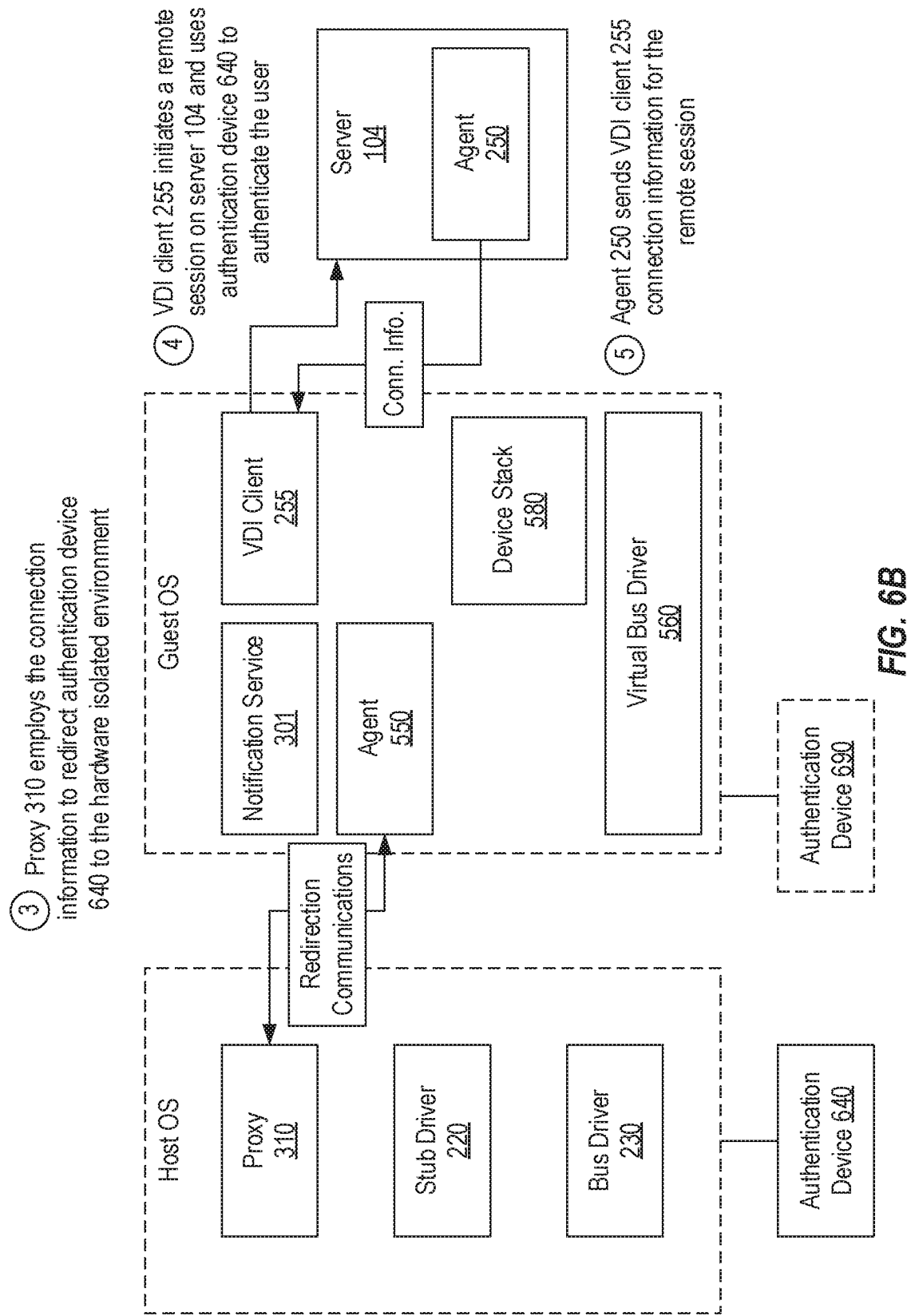

Turning to FIG. 6B, in step 3, proxy 310 can employ the connection information it received from agent 550 to redirect authentication device 640 to the hardware isolated environment thereby causing virtualized authentication device 690 to appear to VDI client 255 as if it were directly connected to the hardware isolated environment. In step 4, VDI client 255 can initiate a remote session on server 104 using authentication device 640. For example, if authentication device 640 is a smart card reader, VDI client 255 could access the user's smart card to perform smart-card-based authentication as part of establishing the remote session on server 104. Once the remote session is established, in step 5, agent 250 can send connection information for the remote session to VDI client 255.

Figure 6C:
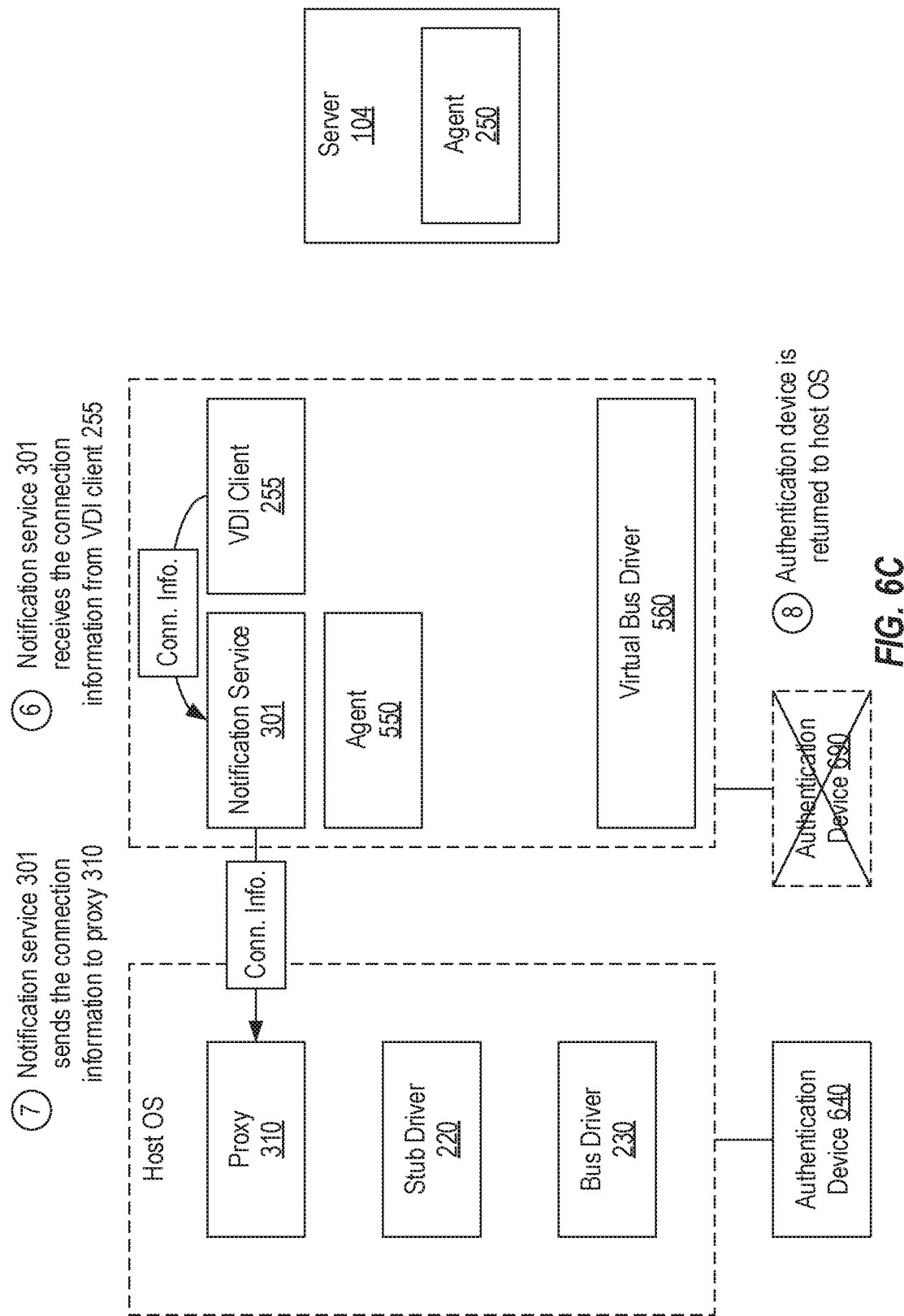

Turning to FIG. 6C, in step 6, notification service 301 can receive the connection information for the remote session from VDI client 255 and, in step 7, send the connection information for the remote session to proxy 310 in a similar manner as described above. In step 8, authentication device 640 can be returned to the host OS (i.e., the redirection can be terminated). For example, when proxy 310 receives the connection information for the remote session, it could reset the USB port to which authentication device 640 is connected and send a notification to agent 550 indicating that authentication device 640 has been disconnected. In response, agent 550 could notify virtual bus driver 560 which in turn could notify the guest OS that authentication device 690 is no longer connected thereby causing device stack 580 to be unloaded.

Figure 6D:
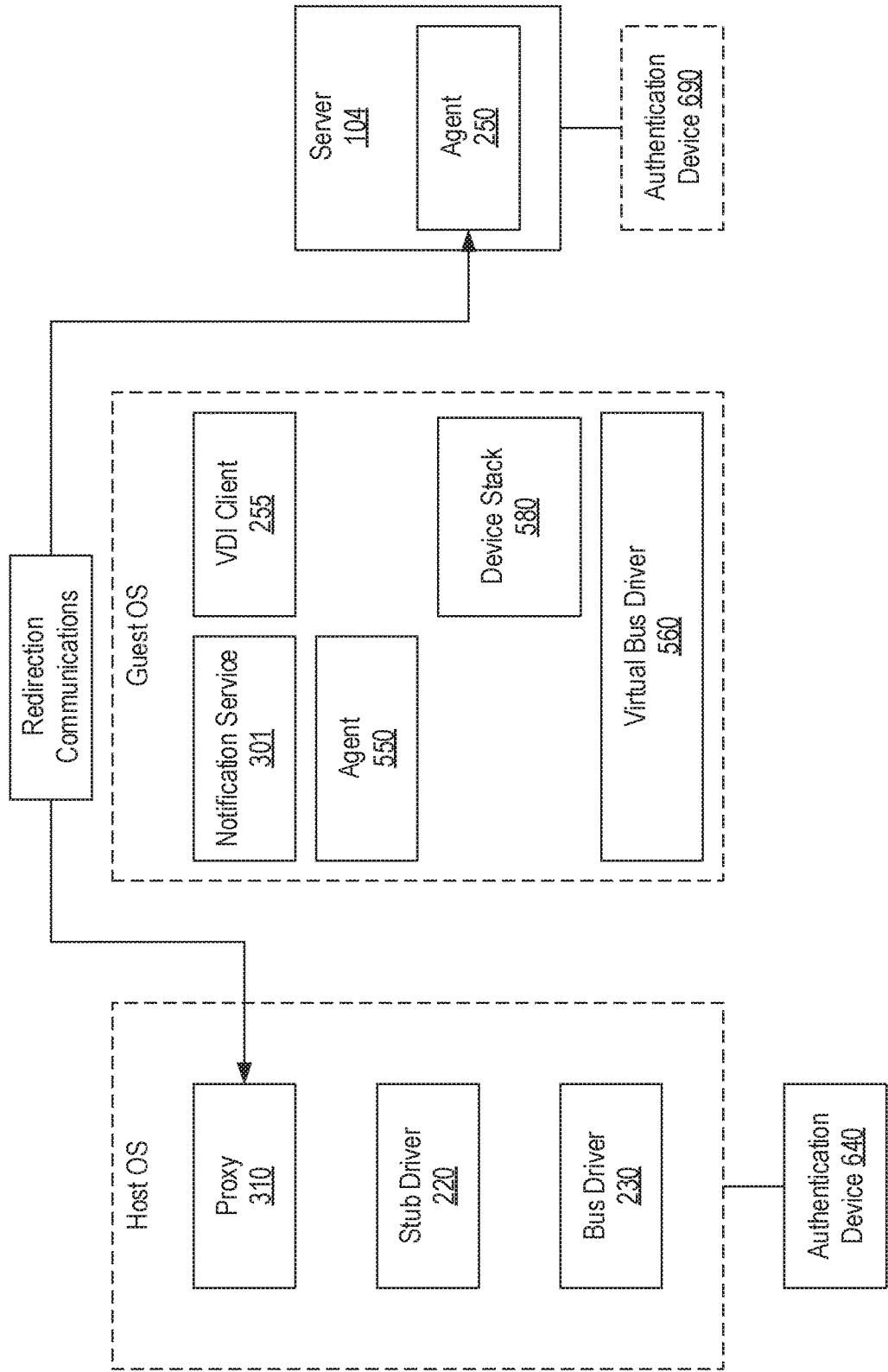

Turning to FIG. 6D, once authentication device 640 has been returned to the host OS (e.g., once the USB port has been reset and the PnP process has been initiated to reconnect authentication device 640), in step 9, proxy 310 can employ the connection information for the remote session to redirect authentication device 640 to server 104 so that it becomes accessible within the remote session that VDI client 255 has established. As a result, an application running in the remote session will be able to access authentication device 640.

Figure 6E:
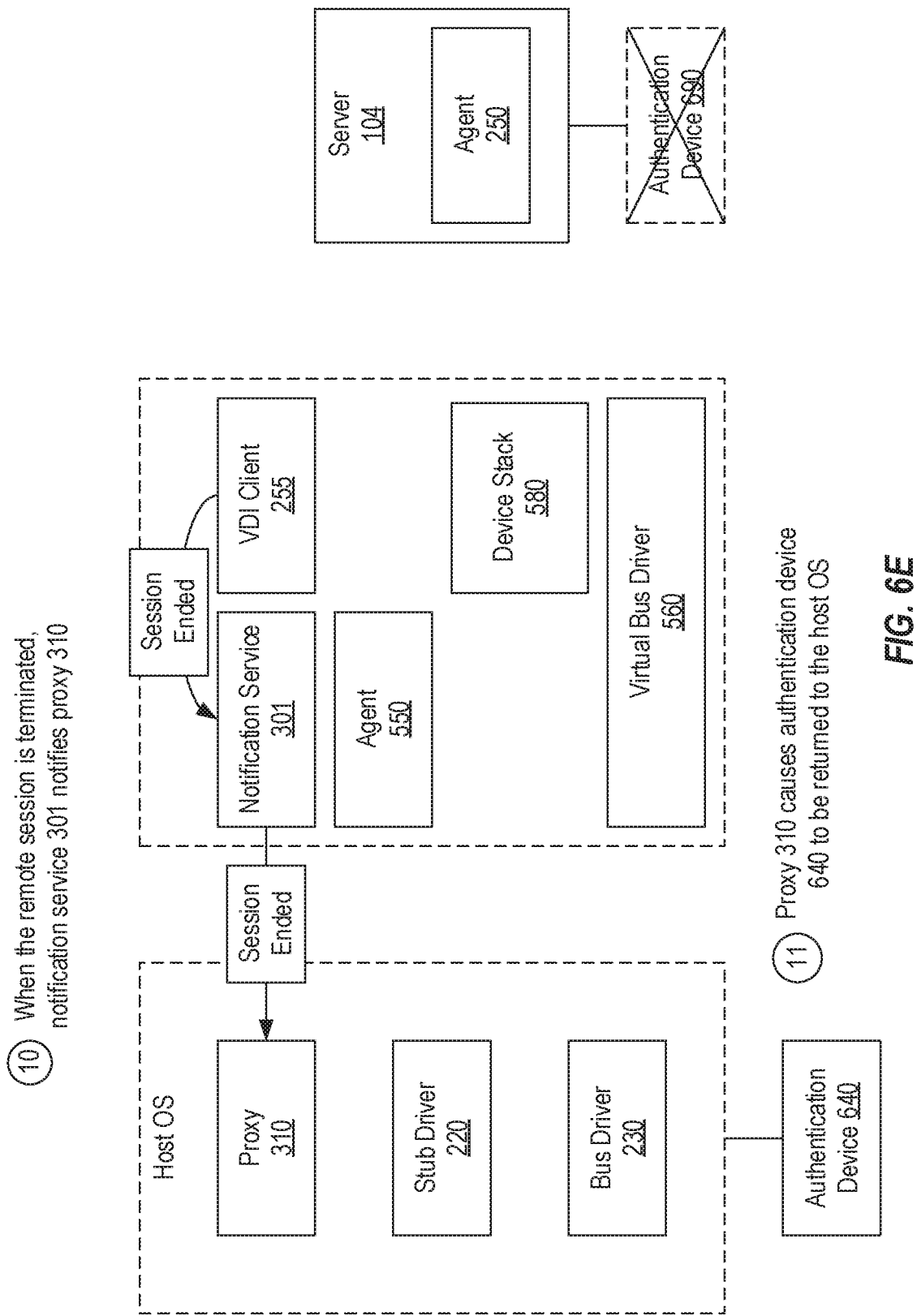

Turning to FIG. 6E, in step 10, notification service 301 can notify proxy 310 when the remote session is terminated. In response, proxy 310 can cause authentication device 640 to be returned to client 102 in a similar manner as described above. Although FIGS. 6A-6E use the example of an authentication device 640, the same technique could be employed with any type of USB device.

Figure 7:
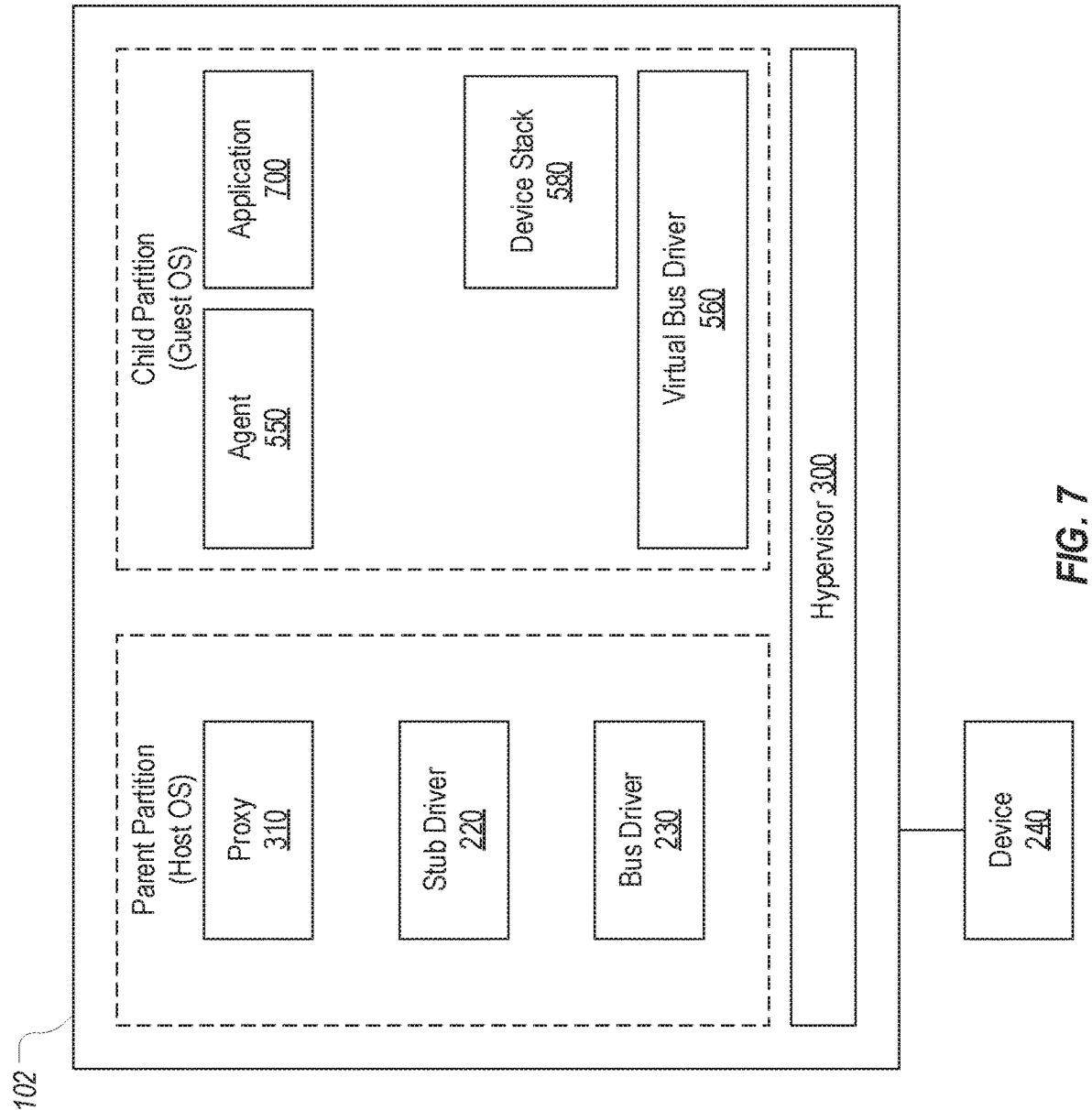
FIG. 7 illustrates another example of a hardware isolated environment in which an application may be run and which can be configured to support redirection of a USB device to allow the application to access the USB device.

A similar technique could be employed to allow any type of application running in a hardware isolated environment on client 102 to obtain access to device 240. FIG. 7 illustrates an example of a hardware isolated environment in which an application 700 is run. As an example, application 700 could be a browser (e.g., the Edge browser) or another application that host OS causes to be launched in a hardware isolated environment. The hardware isolated environment depicted in FIG. 7 is similar to the hardware isolated environment depicted in FIG. 5 but does not include (or does not need to include) notification service 301. With this configuration, steps similar to steps 1-3 of FIGS. 6A and 6B can be performed to redirect device 240 to the hardware isolated environment to enable application 700 to access device 240. As an example, if device 240 is a printer and application 700 is the Edge browser running in a Hyper-V container, this technique will allow the Edge browser to print to the printer even though the hardware isolated environment prevents the Edge browser from directly accessing USB devices that are connected to client 102.

Figure 8:
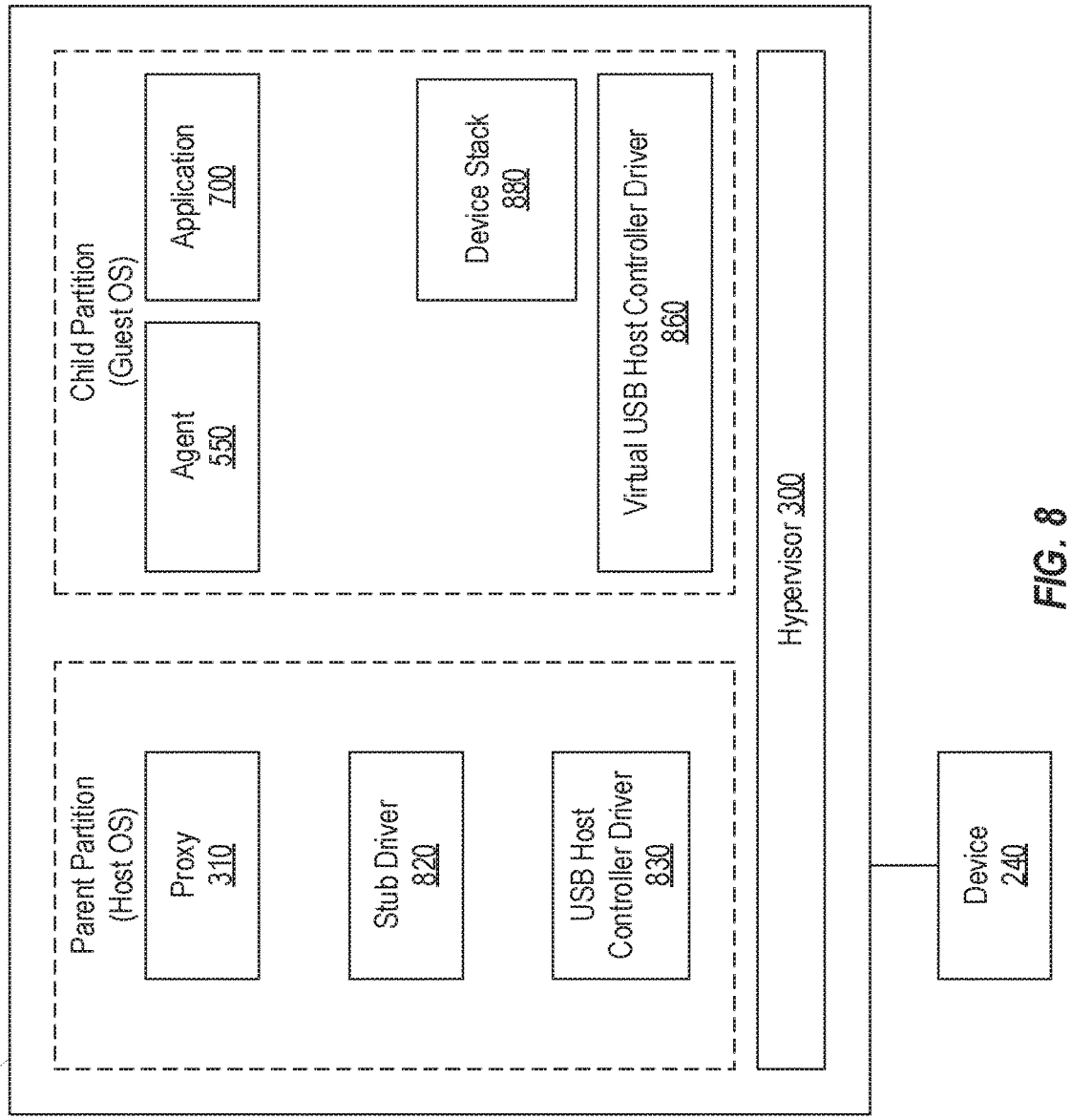
FIG. 8 illustrates another example of a hardware isolated environment in which an application may be run and which can be configured to support redirection of a USB host controller to allow the application to access any USB device that is connected to a corresponding USB port.

FIG. 7 represents a scenario where the USB device itself is redirected. However, in some implementations, a similar technique could be employed to redirect the USB host controller so that any USB device that is connected to a particular USB port will be made accessible to application 700 within the hardware isolated environment. FIG. 8 represents how this can be accomplished. In contrast to FIG. 7, FIG. 8 includes a USB host controller driver 830 above which a stub driver 820 is loaded in the parent partition. Also, a virtual USB host controller driver 860 is loaded in the hardware isolated environment and functions as the virtual counterpart of USB host controller 830. A device stack 880, which can be viewed as including a bus driver and the actual driver(s) for device 240, will also be loaded in the hardware isolated environment. Because redirection occurs at the host controller level, a virtualized USB port will appear in the hardware isolated environment representing the USB port to which device 240 is connected. As a result, any USB device that the user may connect to this "reserved" USB port will be redirected to the hardware isolated environment and become accessible to application 700.

Although not shown, in some embodiments, the hardware isolated environments depicted above can be configured to implement application-level restrictions for accessing device 240/640. For example, the hardware isolated environments shown in FIGS. 5, 7 and 8 could be configured to load a filter driver on device stack 580/880 that inspects I/O requests targeting device 240 (or any other device that may be redirected) and blocks any I/O request that originates from an unauthorized application.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling a USB device that is connected to a client terminal to be accessed within a remote session that a virtual desktop infrastructure (VDI) client establishes on a server when the VDI client runs in a hardware isolated environment on the client terminal, the method comprising:

receiving, at a notification service that runs in the hardware isolated environment, connection information for the remote session that the VDI client has established on the server;

sending, by the notification service, the connection information for the remote session to a proxy that runs on the client terminal outside the hardware isolated environment;

employing, by the proxy, the connection information for the remote session to redirect the USB device to the server to thereby cause the USB device to become accessible within the remote session.

2. The method of claim 1, wherein the connection information for the remote session includes an IP address of the server and a port number of an agent that runs on the server.

3. The method of claim 1, wherein the notification service receives the connection information for the remote session from the VDI client via a virtual channel.

4. The method of claim 1, wherein the hardware isolated environment is a virtual machine.

5. The method of claim 1, further comprising:
receiving, at the notification service, a notification that the remote session has terminated;
sending, by the notification service, a corresponding notification to the proxy; and
in response to the corresponding notification, causing, by the proxy, the USB device to be returned to the client terminal.

6. The method of claim 1, wherein the VDI client runs in a browser in the hardware isolated environment.

7. The method of claim 1, further comprising:
sending, by an agent that runs in the hardware isolated environment, connection information for the hardware isolated environment to the proxy;
employing, by the proxy, the connection information for the hardware isolated environment to redirect the USB device to the hardware isolated environment to thereby cause the USB device to become accessible within the hardware isolated environment.

8. The method of claim 7, wherein the proxy redirects the USB device to the hardware isolated environment prior to redirecting the USB device to the server.

9. The method of claim 8, wherein the notification service receives the connection information for the remote session while the USB device is redirected to the hardware isolated environment.

10. One or more computer storage media storing computer executable instructions which when executed on a client terminal implement a method for enabling a USB device that is connected to a client terminal to be accessed within a remote session that a virtual desktop infrastructure (VDI) client establishes on a server when the VDI client runs in a hardware isolated environment on the client terminal, the method comprising:

in response to the VDI client establishing the remote session on the server, receiving, at a notification service that runs in the hardware isolated environment, connection information for the remote session;

sending, by the notification service, the connection information for the remote session to a proxy that runs on the client terminal outside the hardware isolated environment;

employing, by the proxy, the connection information for the remote session to redirect the USB device to the server to thereby cause the USB device to become accessible within the remote session.

11. The computer storage media of claim 10, wherein the method further comprises:
prior to the VDI client establishing the remote session, sending, by an agent that runs in the hardware isolated environment, connection information for the hardware isolated environment to the proxy;
employing, by the proxy, the connection information for the hardware isolated environment to redirect the USB device to the hardware isolated environment to thereby cause the USB device to become accessible within the hardware isolated environment such that the VDI client can employ the USB device to establish the remote session.

12. The computer storage media of claim 11, wherein the USB device is an authentication device.

13. The computer storage media of claim 10, wherein the method further comprises:
ceasing, by the proxy, the redirection of the USB device to the hardware isolation environment in response to receiving the connection information for the remote session.

14. A method for enabling a USB device that is connected to a client terminal to be accessed when an application runs in a hardware isolated environment on the client terminal, the method comprising:
in conjunction with the hardware isolated environment being created on the client terminal, running an agent in the hardware isolated environment;
sending, by the agent, connection information for the hardware isolated environment to a proxy that runs on the client terminal outside the hardware isolated environment; and
employing, by the proxy, the connection information to redirect the USB device to the hardware isolated environment to thereby cause the USB device to become accessible to an application that runs in the hardware isolated environment.

15. The method of claim 14, wherein the application is a VDI client, the method further comprising:
receiving, at a notification service that runs in the hardware isolated environment, connection information for a remote session that the VDI client has established on a server;
sending, by the notification service, the connection information for the remote session to the proxy;
employing, by the proxy, the connection information for the remote session to redirect the USB device to the server to thereby cause the USB device to become accessible within the remote session.

16. The method of claim 15, wherein the proxy redirects the USB device to the hardware isolated environment to enable the VDI client to employ the USB device to establish the remote session and then redirects the USB device to the server.

17. The method of claim 15, wherein the USB device is an authentication device.

18. The method of claim 15, further comprising:
receiving, at the notification service, a notification that the remote session has terminated;
sending, by the notification service, a corresponding notification to the proxy; and
in response to the corresponding notification, causing, by the proxy, the USB device to be returned to the client terminal.

19. The method of claim 14, wherein the USB device comprises a USB host controller.

20. The method of claim 14, wherein the hardware isolated environment is a virtual machine and the application is a browser.

* * * * *